United States Patent
Thompson et al.

(10) Patent No.: US 9,798,983 B2
(45) Date of Patent: Oct. 24, 2017

(54) ENTERPRISE RESOURCE SEARCH AND RESERVATION SYSTEM

(71) Applicant: Wal-Mart Stores, Inc., Bentonville, AR (US)

(72) Inventors: John Paul Thompson, Bentonville, AR (US); Kurt Haas, Bentonville, AR (US); Eric Letson, Bentonville, AR (US); Christopher Johnson, Pea Ridge, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 560 days.

(21) Appl. No.: 13/793,633

(22) Filed: Mar. 11, 2013

(65) Prior Publication Data

US 2014/0257883 A1    Sep. 11, 2014

(51) Int. Cl.
    *G06Q 10/02* (2012.01)
    *G06Q 10/06* (2012.01)

(52) U.S. Cl.
    CPC ............ *G06Q 10/02* (2013.01); *G06Q 10/06* (2013.01); *G06Q 10/0631* (2013.01)

(58) Field of Classification Search
    CPC ...................................................... G06Q 10/02
    See application file for complete search history.

(56) References Cited

U.S. PATENT DOCUMENTS 6,766,956 B1 *  7/2004  Boylan et al. .......... 235/462.45
8,065,175 B1 * 11/2011  Lewis ........................ 705/7.19
2004/0175159 A1 *  9/2004  Oetzel et al. .................. 386/125
2004/0260594 A1 * 12/2004  Maddox, Jr. ............ G06Q 10/06 705/305
2006/0020515 A1 *  1/2006  Lee et al. ......................... 705/22

(Continued)

OTHER PUBLICATIONS

Microsoft Outlook 2010 Room Finder feature, description available at https://support.office.com/en-US/article/schedule-a-meeting-with-other-people-e36314a5-0163-47d4-951f-886ba2a6d36b, last accessed Jul. 14, 2015.

*Primary Examiner* — Brian Epstein
*Assistant Examiner* — Rupangini Singh
(74) *Attorney, Agent, or Firm* — McCarter & English, LLP; David R. Burns

(57) ABSTRACT

Exemplary embodiments are directed to reserving physical resources in an enterprise via an electronic reservation environment. An electronic search request for an availability of one or more resources in an enterprise is received from a user through a web page and/or a mobile application and is submitted to a reservation engine. The search request includes one or more resource search parameters received via a graphical user interface associated with the electronic reservation environment. A result identifying resources that satisfy the resource search parameters in the request is received in response to the search request and an electronic metadata request is automatically submitted in response to receipt of the result. The electronic metadata request including resource identifiers corresponding to the resources identified in the result. Metadata corresponding to the resources identified in the result is received and an identity of the resources returned in the result, an availability of the resources, and the metadata associated with the resources is displayed to the user.

21 Claims, 11 Drawing Sheets

(56) References Cited

U.S. PATENT DOCUMENTS

| | | | |
|---|---|---|---|
| 2008/0109289 A1* | 5/2008 | Vivadelli et al. ................. | 705/7 |
| 2010/0017245 A1* | 1/2010 | Kristiansen et al. ............ | 705/8 |
| 2010/0088372 A1* | 4/2010 | Shridhar ................. | G06F 21/41 |
| | | | 709/204 |
| 2010/0125478 A1* | 5/2010 | Bisht ............................... | 705/8 |
| 2011/0060480 A1* | 3/2011 | Mottla .................. | G06Q 10/02 |
| | | | 701/2 |
| 2011/0157366 A1* | 6/2011 | Padmanabh et al. ......... | 348/159 |
| 2011/0276886 A1* | 11/2011 | Hall ....................... | G06Q 10/06 |
| | | | 715/734 |
| 2013/0082101 A1* | 4/2013 | Omansky .............. | G06Q 50/08 |
| | | | 235/376 |

* cited by examiner

ENTERPRISE RESOURCE SEARCH AND RESERVATION SYSTEM

CROSS-REFERENCE TO RELATED APPLICATION

This application is related to U.S. patent application Ser. No. 13/771,919, filed on Feb. 21, 2013, which is hereby incorporated by reference herein in its entirety.

BACKGROUND

Enterprises may have conference rooms for use by its employees and may implement a system to facilitate reserving the conference rooms. Conventional reservation system often do not permit an employee to efficiently search for conference rooms and/or identify available conference rooms that can be reserved. The inability to effectively search for and identify available conference rooms may be manageable for small enterprises. However, for larger enterprises that have a large number of conference rooms that can be distributed across many buildings, an ineffective technique for discovering available conference rooms can lead to underutilization of some conference rooms and an over utilization of other conference rooms. Furthermore, the inability to effectively search for and identify available conference rooms can be a burden on the employees of the enterprise and can result in a time consuming process.

Additionally, conventional reservation systems often do not provide sufficient information about a conference room for an employee to make an informed decision as to whether the employee should reserve the conference room. As an example, the employee may not know the exact location of the conference, what equipment is in the conference room, and what the state of the equipment is in the conference room. If an employee wishes to reserve a conference room with a projector, for example, the employee information about which conference rooms have a projector and/or whether the projector in the conference room is operational may not be readily available to the employee.

Therefore, there is a need for a more robust and effective approach to search for and identify enterprise resources that can be reserved for use by its employees.

SUMMARY

Exemplary embodiments of the present disclosure are directed to reserving physical resources in an enterprise via an electronic reservation environment.

In one embodiment, a method of reserving resources in an enterprise via an electronic reservation environment is disclosed. The method includes receiving, via a data communications network, an electronic search request for an availability of one or more resources in an enterprise. The search request includes one or more resource search parameters received via a graphical user interface associated with the electronic reservation environment. The method also includes searching for resources based on the resource search parameters, outputting a result identifying resources in response to the search request and submitting an electronic metadata request automatically, via the data communication network, in response to receipt of the result. The electronic metadata request includes resource identifiers corresponding to the resources identified in the result. The method further includes retrieving metadata corresponding to the resources identified in the result and displaying an identity of the resources returned in the result, an availability of the resources, and the metadata associated with the resources In another embodiment, a non-transitory computer-readable storage device configured to store instruction executable by a processing device is disclosed. Execution of the instructions by the processing device causes the processing device to implement a method of reserving resources in an enterprise by receiving, via a data communications network, an electronic search request for an availability of one or more resources in an enterprise, searching for resources based on the resource search parameters; outputting a result identifying resources in response to the search request, submitting an electronic metadata request automatically, via the data communication network, in response to receipt of the result, retrieving metadata corresponding to the resources identified in the result, and displaying an identity of the resources returned in the result, an availability of the resources, and the metadata associated with the resources. The search request includes one or more resource search parameters received via a graphical user interface and the electronic metadata request includes resource identifiers corresponding to the resources identified in the result.

In yet another embodiment, a system for reserving resources in an enterprise that includes a non-transitory computer readable medium and a processing device is disclosed. The non-transitory computer readable medium stores instructions for implementing a front end reservation system. The processing device is operatively coupled to the computer readable medium and programmed to execute the instructions to receive, via a data communications network, an electronic search request for an availability of one or more resources in an enterprise, search for resources based on the resource search parameters, output a result identifying resources in response to the search request, submit an electronic metadata request automatically, via the data communication network, in response to receipt of the result, retrieve metadata corresponding to the resources identified in the result, and display an identity of the resources returned in the result, an availability of the resources, and the metadata associated with the resources. The search request includes one or more resource search parameters received via a graphical user interface and the electronic metadata request includes resource identifiers corresponding to the resources identified in the result.

In some embodiments, the resource search parameters can include an availability of the user.

In some embodiments, the metadata can include at least one selectable link to a location map associated with one of the resources and the method further comprises receiving a selection of the link from a user and display a map of the location of the resource. The map can be an interactive map to facilitate display of the user's position relative to the location of the resource.

In some embodiments, a reservation request that includes reservation parameters can be submitted in response to a selection by the user reservation parameters and it can be determined whether the user has authority to reserve the resource. The resource can be reserved in response to the reservation request. In some embodiments, a confirmation of reserving the resource can be received. In some embodiments, a subsequent reservation request for the resource that conflicts with an availability of the resource can be received and a preexisting reservation for the resource can be replaced by a subsequent reservation to permit the resource to be reserved in response to receipt of the subsequent reservation request.

In some embodiments, a waiting list for an unavailable resource can be maintained and a user can be notified when the unavailable resource becomes available.

In some embodiments, an encoded identifier at the physical location of the resource can be scanned to at least one of display reservation information associated with the resource, report an issue associated with the resource, or submit the resource search request. An availability of the resource can be displayed in response to the request and reservation request for the resource can be submitted based on the availability.

In some embodiments, an unavailability of the resources can be received in the result and the availability of the resources can be programmatically determined based on the unavailability. The availability of the resources can be displayed with the identity of the resources and the metadata.

In some embodiments, the metadata associated with the resource provides information corresponding to a condition of the resource. The condition of the resource can include a status of equipment associated with the resource. The condition of the resource can be entered in the graphical user interface by the user.

Any combination of embodiments is envisioned. Other objects and features will become apparent from the following detailed description considered in conjunction with the accompanying drawings. It is to be understood, however, that the drawings are designed as an illustration only and not as a definition of the limits of the invention.

DESCRIPTION OF EXEMPLARY EMBODIMENTS

Figure 1:
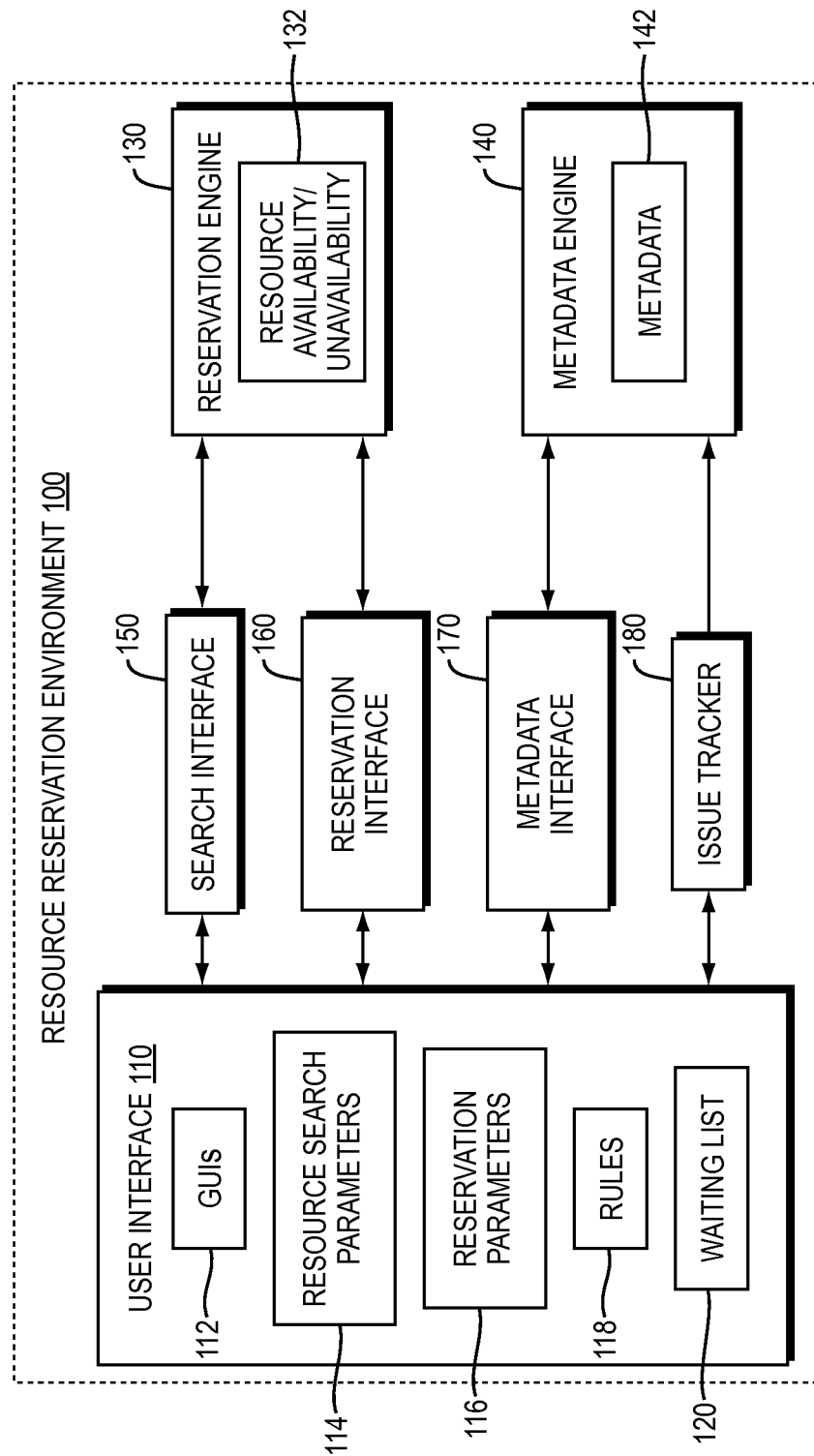
FIG. 1 is a block diagram of an exemplary resource reservation environment.

Exemplary embodiments of the present disclosure are directed to reserving physical resources in an enterprise via an electronic reservation environment. In exemplary embodiments, an electronic search request for an availability of one or more resources in an enterprise is received from a user through a web page and/or a mobile application and is submitted to a reservation engine. A result identifying resources that satisfy the resource search parameters in the request can be received in response to the search request and an electronic metadata request can be automatically submitted in response to receipt of the result. Metadata corresponding to the resources identified in the result can be returned and an identity of the resources returned in the result, an availability of the resources, and the metadata associated with the resources is displayed to the user. The user can select one of the resources returned in the search to reserve one of the resources.

Exemplary embodiments advantageously provide for searching and discovery of resources (e.g., conference rooms) in an enterprise and facilitate informed decisions as to whether to reserve a resource based on the condition and state of the resource. A user of the electronic reservation environment of the present disclosure can search for available resources across an enterprise using resource search parameters that can be entered by the user to focus the search based on their criteria for the resource. For example, exemplary embodiments of the present disclosure advantageously enable a user to search for a resource based on a location of the resource, a date for which they would like to reserve the resource, a time for which they would like to reserve the resource, an occupancy capacity they require for the resource, and so on.

In response to the search, the exemplary embodiments of the present disclosure advantageously provides a list of resources that satisfy the search parameters and the availability of the resources in the list. Exemplary embodiments can also provide additional information in the list to enable the user to make an informed decision as to whether the user should reserve the resource. For example, exemplary embodiments of the present disclosure can advantageously provide information related to the equipment associated with the resource, an operational status of the equipment associated with the resource, and/or a visual map that show a location of the resource. In this regard, exemplary embodiments of the present disclosure allow the user to select and reserve a specific resource according to his/her needs.

Exemplary embodiments of the present disclosure can enable users to reduce the time it takes to identify and reserve enterprise resources, increase productivity, and improve resource efficiency and usage.

As used herein, the term "enterprise resource" or "resource" refers to a physical object or thing (i.e., a physical resource) that can be reserved for use, including, for example, a room (e.g., a conference room or office) and/or equipment (e.g., a projector, computer, whiteboard, etc.).

FIG. 1 is a block diagram of an exemplary electronic resource reservation environment 100 (hereinafter "environment 100"). Exemplary embodiments of the environment 100 can be implemented using hardware, software, and/or a combination thereof. For example, in one exemplary embodiment, one or more computing devices, such as one or more client devices and/or one or more servers, can be configured to implement exemplary embodiments of the environment 100. Exemplary embodiments of a client device and/or a server programmed and/or configured to implement embodiments of the environment 100, or portions thereof, is shown, for example, in FIGS. 6 and 7. The environment 100 can include a user interface 110, a reservation engine 130, a metadata engine 140, a search interface 150, a reservation interface 160, a metadata interface 170, and an issue tracker 180. In exemplary embodiments, the user interface 110, the search interface 150, the reservation interface 160, the metadata interface 170, and the issue tracker 180 can be referred to as a front end reservation system and the reservation engine 130 and the metadata engine 140 can be referred to as a back end reservation system. The environment 100 can be programmed and/or include executable code to implement a resource reservation process to reserve enterprise resources in response to requests from users.

In exemplary embodiments, the user interface 110 can be programmed and/or include executable code to provide one or more graphical user interfaces (GUIs) 112 through which a user can interact with the environment 100. As an example, in some embodiments, the user interface 110 can be associated with one or more web pages and/or can be implemented as a client-side application, as discussed in more detail below with reference to FIG. 9. The GUIs 112 displayed to users can include data entry areas to receive information from the customer and/or can include data outputs to display information to the customer. For example, one of the GUIs 112 can allow a user to enter resource search parameters 114 that can be used to generate a resource search request and can display resources returned in response to the search request along with metadata associated with the resources. Likewise, one or more of the GUIs 112 can allow the user to enter reservation parameters 116, which can be used to generate a reservation request to reserve a resource.

In exemplary embodiments, the resource search parameters 114 can be specified by a user and/or environment 100. For example, in exemplary embodiments, the resource search parameters 114 can include a location of the resource, a type of resource (e.g., a conference room, office, equipment), a size of the resource, a maximum occupancy of the resource (e.g. a quantity of people that a room holds), equipment requirements in a room, existence of issues associated with the enterprise resource, a status of any equipment associated with the resource, as well as other resource parameters. In some embodiments, the user interface 110 can be programmed and/or include executable code to specify some of the resource search parameters 114 and/or to restrict a user's entries to choices specified by the user interface 110. For example, the user interface 110 can be programmed and/or include executable code to restrict a user's entries based on a title or position held by the user in the enterprise. For example, some enterprise resources can be restricted to one or more groups of authorized users such that only authorized users can view availability of some of the resources.

In exemplary embodiments, the reservation parameters 116 can be specified by a user and/or environment 100. For example, in exemplary embodiments, the reservation parameters 116 can include a day, a start time, an end time, a resource identifier, a quantity of attendees, special requirements (e.g., hospitality, food, beverages), an authorization code, as well as other parameters. In some embodiments, the user interface 110 can be programmed and/or include executable code to specify some of the reservation parameters 116 and/or to restrict a user's entries to choices specified by the user interface 110. For example, the user interface 110 can be programmed and/or include executable code to specify available time periods from which the user can chose, available days from which the user can select, a maximum number of attendees that can be included in the reservation, as well as other parameters. Likewise, in some embodiments, the user interface 110 can be programmed and/or include executable code to restrict the user's reservation choices based on a title or position held by the user in the enterprise and/or a location at which the user works. For example, reservation of some enterprise resources can be restricted to one or more groups of authorized users such that only authorized user can reserve and use some of the resources.

In exemplary embodiments, the user interface 110 can be programmed and/or configured to implement a reservation workflow. For example, in one embodiment, the user interface can be programmed and/or configured to implement a set of rules 118 governing the reserving of enterprise resources. Some examples of the rules 118 that can be implemented include, for example, specifying a minimum number of attendees required to reserve a resource, an approval process requiring approval from one or more people before a resource can be reserved (e.g., a supervisor, manager, etc.), requiring that the user reserving the resource work in a building within which the resource resides, and/or any other suitable rules to govern reserving of resources.

In exemplary embodiments, the user interface 110 can be programmed and/or configured to maintain a waiting list 120 for availability enterprise resources. For example, if a user wishes to reserve an enterprise resource that is unavailable, the user can have the option of being added to the waiting list 120 for the enterprise resource. Once the enterprise resource becomes available, the user can be notified of the availability.

In exemplary embodiments, the user interface 110 can be programmed and/or configured to permit users to override the unavailability of an enterprise resource. For example, a first user can reserve an enterprise resource for a specific date and time and a second user who wishes to reserve the same resource for the same or an overlapping date and time can override the first user's reservation and can reserve the enterprise resource. The user interface 110 can be programmed and/or configured to permit overriding a reservation based on one or more reasons. For example, a user can be allowed to override a reservation if a minimum number of attendees for the resource is not satisfied in the existing reservation, if the resource has a special designation, if the resource is not being used at the reserved time, and/or for any other suitable reason. If the resource is not being used at the reserved time, the user interface can provide a grace period (e.g., 15 minutes) from the start of the reservation before another user is permitted to override the existing reservation.

In some embodiments, before a user can override an existing reservation, the request to override the reservation can be processed to determine whether the user who wishes to override the reservation is authorized to override the reservation and/or a request to override the reservation can require approval. As one example, the environment 100 can be programmed and/or configured to allow a user who has a specified job title (e.g., vice president, director, etc.) to override a reservation (e.g., with or without requiring approval). As another example, the environment 100 can be programmed and/or configured to require some, all, or none of the employees to receive approval before overriding a reservation. In some embodiments, when a user overrides a reservation, the user interface 110 can be programmed and/or configured to notify the user that made the preexisting reservation and/or the attendees identified for the pre-existing reservation. In some embodiments, when a request to override a reservation is received, and/or the request can be entered into a workflow that routes the request to one or more employees for approval before the user can override the preexisting reservation.

In exemplary embodiments, the environment 100 can be programmed to maintain a record of reservations that have been overridden. For example, the environment 100 can be programmed and/or configured to record who previously reserved the resource, who requested to override the reservation, the reason for overriding the reservation, the project associated with the previous reservation and/or the overriding reservation, and/or any other suitable information. The user interface 110 can estimate a cost associated with overriding a preexisting reservation based on, for example, a quantity of time required for the displaced user(s) to reserve another resource and move any necessary items to the other resource. The monetary cost of the displacing the user of the preexisting reservation can be displayed to the user overriding the reservation and/or can be maintained as part of the record.

In exemplary embodiments, the user interface 110 can be programmed and/or configured to permit a user to scan an encoded identifier, such as a bar code and/or a quick response code (QR code) located at the physical location of an enterprise resource. Upon scanning the encoded identifier, the user interface 110 can display information related to the enterprise resource including, for example, an availability of the enterprise resource, information about the enterprise resource including metadata associated with the enterprise resource that is maintained by the metadata engine 140 as described below, and/or any other suitable information. The user interface 110 can be programmed and/or configured to permit the user to reserve the enterprise resource associated with the encoded identifier in response to scanning the encoded identifier. In some embodiments, if the user previously reserved the enterprise resource, the user can release the reservation so that the enterprise resource is no longer unavailable for the period for which the user previously reserved the enterprise resource. In some embodiments, upon scanning the encoded identifier, the user can report an issue associated with the enterprise resource.

The reservation engine 130 can be programmed and/or include executable code to reserve and maintain an availability/unavailability of enterprise resources (i.e. resource availability/unavailability 132). The reservation engine 130 can be programmed to receive enterprise resource search requests and to provide search results in response to the research requests. The search results can include a set of enterprise resources that satisfy resource search parameters included in the search request. Likewise, the reservation engine 130 can be programmed to receive reservation requests and to reserve one or more enterprise resources in response to the reservation requests. Upon reserving an enterprise resource, the reservation engine 130 can update the status of the enterprise resource to unavailable for the period specified in the reservation, can create and send a calendar invitation to one or more identified attendees, and/or can schedule reminder notifications. In some embodiments, the reservation engine 130 can be implemented using Microsoft Exchange from Microsoft and can interact with Microsoft Outlook to access and/or modify calendar entries of employees of the enterprise based on reservations made using the environment 100.

The metadata engine 140 can be programmed and/or include executable code to maintain metadata 142 associated with the enterprise resources. The metadata 142 can be updated manually and/or automatically and can be associated with corresponding enterprise resources based on an identifier associated with the enterprise resources. For example, the metadata engine 140 can be programmed to receive metadata requests and to provide metadata 142 in response to the requests. The metadata 142 can correspond to enterprise resources returned by the reservation engine 130 in response to a search request. In exemplary embodiments, metadata maintained by the metadata engine 140 can include, for example, information about the enterprise resources, such as equipment associated with the enterprise resource (e.g., projector, computer, whiteboard, podium, etc.), existence of nonfunctioning or malfunctioning equipment, a number of chairs available, handicap accessibility, whether the resource has an associated bar code or quick response code (QR code), and/or any other suitable information. In some embodiments, the metadata engine 140 can be implemented using SharePoint from Microsoft.

The search interface 150 can be programmed and/or include executable code to provide an interface between the user interface 110 and the reservation engine 130 to facilitate initiating resource search requests and returning search results. In exemplary embodiments, the search interface 150 can be programmed to receive search parameters from the user interface 110 and can create a query including the search parameters to request a set of enterprise resources from the reservation engine 130 that satisfy the search parameters. In some embodiments, the search interface can call a web service to facilitate interaction with the reservation engine 130. A web service can be a software function that facilitates machine-to-machine interaction to allow different applications from different sources to communicate with each other. The search interface 150 can receive a response to the search request from the reservation engine 130 and can format the search results for display by the user interface 110.

The reservation interface 160 can be programmed and/or include executable code to provide an interface between the user interface 110 and the reservation engine 130 to facilitate initiating resource reservations. In exemplary embodiments, the reservation interface 160 can be programmed to receive reservation parameters from the user interface 110 and can create a query including the reservation parameters to request the reservation engine 130 to reserve an enterprise resource in accordance with the reservation parameters. In some embodiments, the reservation interface 160 can call a web service to facilitate interaction with the reservation engine 130. The reservation interface 160 can receive a response to the reservation request from the reservation engine 115 and can provide a confirmation to the user interface 110 for display.

The metadata interface 170 can be programmed and/or include executable code to provide an interface between the user interface 110 and the metadata engine 140 to facilitate initiating metadata requests in response to the receipt of search results from the reservation engine 130. In exemplary embodiments, the metadata interface 170 can be programmed to receive resource identifiers from the user interface 110 based on the set of resources returned from a search and can create a query including the resource identifiers to request a metadata for each enterprise resource identified in the set of enterprise resources. In some embodiments, the metadata interface can call a web service to facilitate interaction with the metadata engine 140. The metadata interface 170 can receive a response to the metadata request from the metadata engine 150. The response can include the metadata for the enterprise resources and the metadata interface can provide the metadata to the user interface 110 for display with the set of enterprise resources returned by the reservation engine 130.

The issue tracker 180 can be programmed and/or include executable code to receive one or more issues associated with enterprise resources from the user interface 110 and to update the metadata maintained by the metadata engine 170 in response to receipt of the one or more issues. The issues can include any problem or malfunctions associated with the enterprise resource and/or equipment residing in the enterprise resource. For example, in one embodiment the resource can be a conference room that includes nonfunctioning projector, this information can be included in the metadata. Once the issues have been incorporated into the metadata, the metadata engine 140 can programmatically incorporate the issues when responding to metadata requests so that any issues associated with the enterprise resources can be displayed to the user with the enterprise resources. As one example, in some embodiments, if the enterprise resource is a conference room with a nonfunctioning projector, this information can be displayed with other information about the conference room. As another example, in some embodiments, a selectable link can be display that can be selected by the user to view issues associated with the enterprise resource.

In some embodiments, the issue tracker 180 can be programmed and/or configured to track and/or maintain a log of issues associated with enterprise resources. In one embodiment, the issuer tracker 180 can be programmed and/or configured to implement and/or interface with a maintenance workflow. For example, when an issue associated with an enterprise resource is identified and/or submitted by a user, the issue tracker 180 can receive the issue and can generate an electronic maintenance (trouble) ticket which can enter a maintenance workflow to report the issue to an employee tasked with resolving the issue. Once the issue is resolved, the employee can close the ticket and submit an update to the issue tracker 180, which can update the metadata to indicate that the issue has been resolved. In some embodiments, when an issue is identified and submitted to the issue tracker, existence of the issue can also be forwarded to users that have already reserved the enterprise resource to alert the users of the issue.

While the present embodiment shows the search interface, reservation interface, metadata interface, and issue tracker as being implemented separate from the user interface, those skilled in the art will recognize that the search interface, reservation interface, metadata interface, and/or issue tracker can be integrated with and/or can be a component of the user interface.

Figure 2:
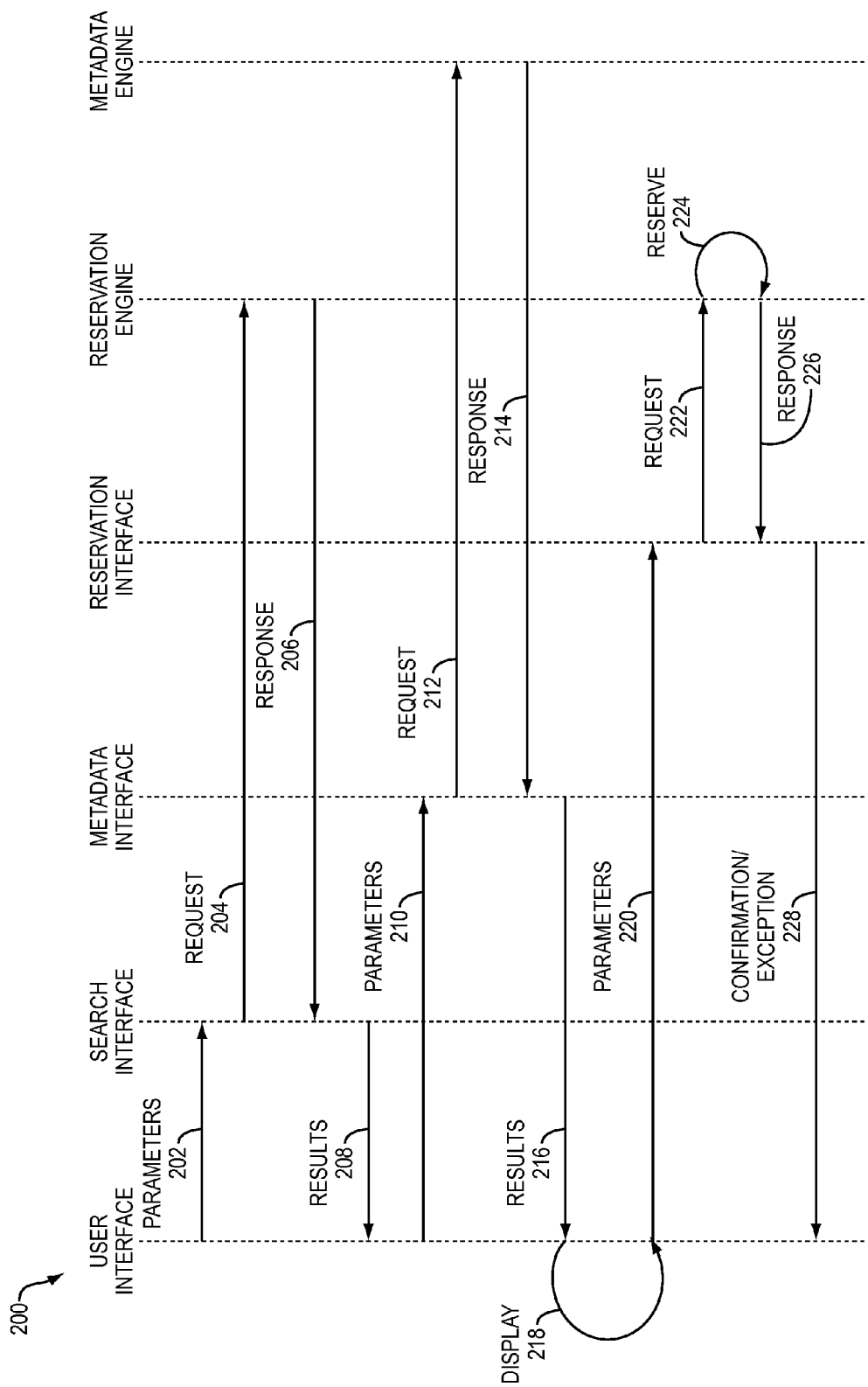
FIG. 2 is a data flow diagram of an exemplary operation of one embodiment of the environment.

FIG. 2 is a data flow diagram 200 of an exemplary operation of one embodiment of the environment 100. A user can submit resource search parameters using the user interface and the search parameters can be passed to the search interface, as illustrated by arrow 202, which can construct a search request and call a web service to submit the search request to the reservation engine, as illustrated by arrow 204. For example, in exemplary embodiments, the search interface can create an HTML and/or JavaScript query and can use a simple object access protocol (SOAP) web service to request a list of enterprise resources satisfying the search parameters. In response, the reservation engine can return search results including resources that satisfy the parameters of the search request to the search interface, as shown by arrow 206. The search interface can format the search results and provide the search results to the user interface for subsequent display, as shown by arrow 208. For example, search results can identify an unavailability of the enterprise resources and the search interface can be programmed and/or configured to inverse the search results to identify an availability of the enterprise resources.

In response to the search results, the user interface can programmatically provide identifiers, such a name of the resource and/or a string of alphanumeric characters unique to the resource, to the metadata interface corresponding to the resource returned in the search results, as shown by arrow 210. The metadata interface can construct a metadata request based on the identifiers and can call a web service to submit the metadata request to the metadata engine, as shown by arrow 212. For example, in exemplary embodiments, the metadata interface can create an HTML and/or JavaScript query and can use a simple object access protocol (SOAP) web service to request the metadata. The metadata engine can return the results of the metadata request to the metadata interface, as shown by arrow 214, which can format the metadata and provide the metadata to the user interface for subsequent display with the resources returned by the resource search, as shown by arrow 216. The user interface can programmatically display the search results can be displayed with the metadata, as shown by arrow 218.

The user can view the displayed information and can submit reservation parameters using the user interface and the reservation parameters can be passed to the reservation interface, as shown by arrow 220, which can construct a reservation request and call a web service to submit the reservation request to the reservation engine, as shown by arrow 222. For example, in exemplary embodiments, a .NET-based web service can be called to reserve the enterprise resource. The reservation engine can perform a reservation process, as shown by arrow 224 and can provide a response to the reservation request to the reservation interface as shown by arrow 226. If the reservation engine reserves the resource identified in the reservation request, the reservation interface returns a confirmation to the reservation interface, which can forward the confirmation to the user interface for display, as shown by arrow 228. If the reservation engine cannot reserve the resource, the reservation interface can return an exception to the reservation interface, which can forward the exception to the user interface for display, as shown by arrow 228.

Figure 3:
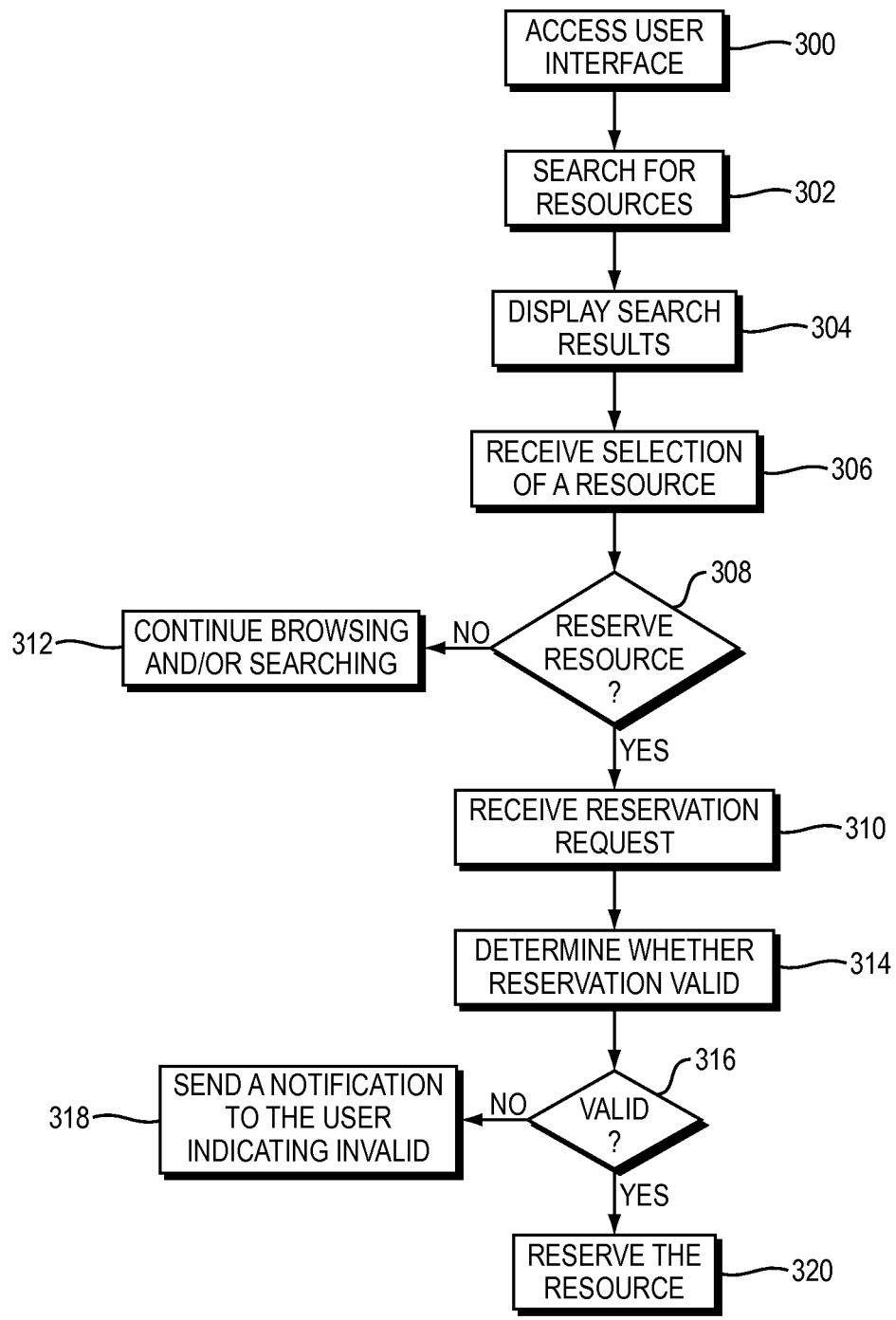
FIG. 3 is a flowchart of an exemplary resource search and reservation process that can be implemented by an exemplary embodiment of the environment.

FIG. 3 is a flowchart of an exemplary resource search and reservation process that can be implemented by an exemplary embodiment of the environment. In step 300, a user can visit a web page or access a client-side application having the GUI of the user interface to search for and/or reserve a resource within an enterprise. In some embodiments, the environment can receive resource search parameters entered by the user to perform a search for resources (step 302). Search results from the search can be displayed to the user (step 304). In exemplary embodiments, the search results can include a list of resources, the resource's availability, as well as other information about the resources. Metadata can be displayed with the resources and can include links to maps showing a location of the resources as well as other metadata. The user can review the search results and the environment can receive a selection of a resource to initiate one or more actions (step 306). For example, selection of a resource can result in a pop-up window being displayed that includes information concerning the resource, the user's web browser navigating to another webpage to display information concerning the resource, and/or other actions.

If the user chooses to reserve the resource (step 308), a request can be submitted on behalf of the user based on reservation parameters entered by the user, which can be captured by the GUI of the user interface of the environment (step 310). Otherwise, the user can continue browsing the search results and/or continue searching for resources (step 312).

Before proceeding with a reservation, the environment can be programmed and/or include executable code to determine whether the reservation parameters specified for the item are valid and/or whether the user has authorization to reserve the resource (step 314). For example, the environment can be programmed and/or include executable code to determine whether the time period associated with the reservation request correspond to the availability of the resource. If the reservation parameters are invalid (step 316), the environment 100 can be programmed and/or include executable code to send a notification to the user indicating that the reservation request cannot be entered (step 318). If the reservation parameters are valid (step 316), the environment 100 can be programmed and/or include executable code to reserve the resource for the user (step 320). In exemplary embodiments, the validity of a reservation request can be determined based on specified rules that govern the reserving of enterprise resources. While the present embodiment illustrates a process sequence, those skilled in the art will recognize that other exemplary embodiments can implement a different sequence.

Figure 4:
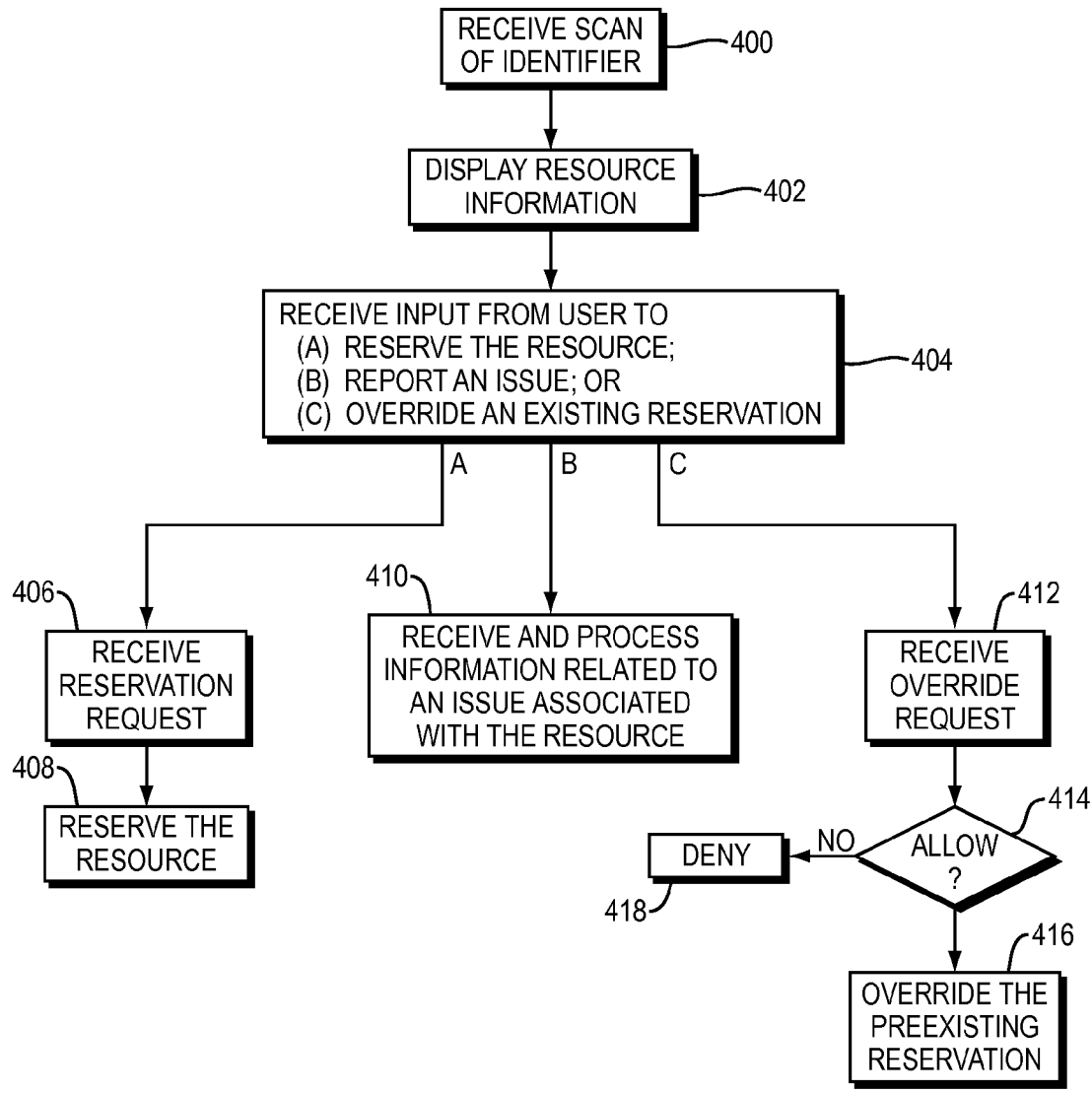
FIG. 4 is a flowchart illustrating another exemplary operation of the resource reservation environment in accordance with exemplary embodiments of the present disclosure.

FIG. 4 is a flowchart illustrating another exemplary operation of the environment 100. In exemplary embodiments, identifiers (encoded identifiers, such as bar codes, QR codes, etc.) can be associated with enterprise resources. Each identifier can uniquely identify a corresponding enterprise resource. For embodiments in which the resource is a room (e.g., a conference room), the identifier can be affixed to or positioned proximately to the door of the room. The identifiers allow a user to retrieve information about a resource, reserve the resource, and/or report an issue associated with the resource by scanning the resource. In exemplary embodiments, the identifiers advantageously facilitate reserving a resource at the time the user wishes to use the resource.

A user carrying an electronic device, such as a cell phone, tablet, and/or another other portable/mobile electronic device configured to interface with a data communication network, can scan the identifier using the electronic device in step 400. In step 402, the environment can be programmed to retrieve and display information corresponding to the resource associated with the identifier. The information can include information about the room, such as, for example, a maximum occupancy, equipment included in the room, issues with the room and/or the equipment therein, and/or any other suitable information about the condition of the room. The information can also include information about availability of the room over a time period, such as an availability of the room for the next hour, for the day, for the week, for the month, and so on.

In step 404, the user can select from one or more options displayed on the electronic device by the environment 100 including, for example: (A) an option to reserve the resource at a time when the resource is available; (B) an option to report an issue with the resource; and/or (C) an option to override an existing reservation of the resource. In response to a selection of the option to reserve the resource at an available time (A), the user can submit a reservation request, which can be received by the environment 100 in step 406 and the environment 100 can be programmed and/or configured to reserve the resource in step 408. In response to a selection of the option to report an issue (B), the user can submit an issue associated with the resource via the electronic device, and the environment 100 can receive from the electronic device and can process the issue as described herein in step 410. In response to a selection of the option to override an existing reservation, the user can submit an override request, which can be received by the environment 100 in step 412. If the user is allowed to override the reservation (step 414), the environment 100 overrides the preexisting reservation to reserve the resource for the user in step 416. Otherwise, the environment 100 denies the override request in step 418.

Figure 5:
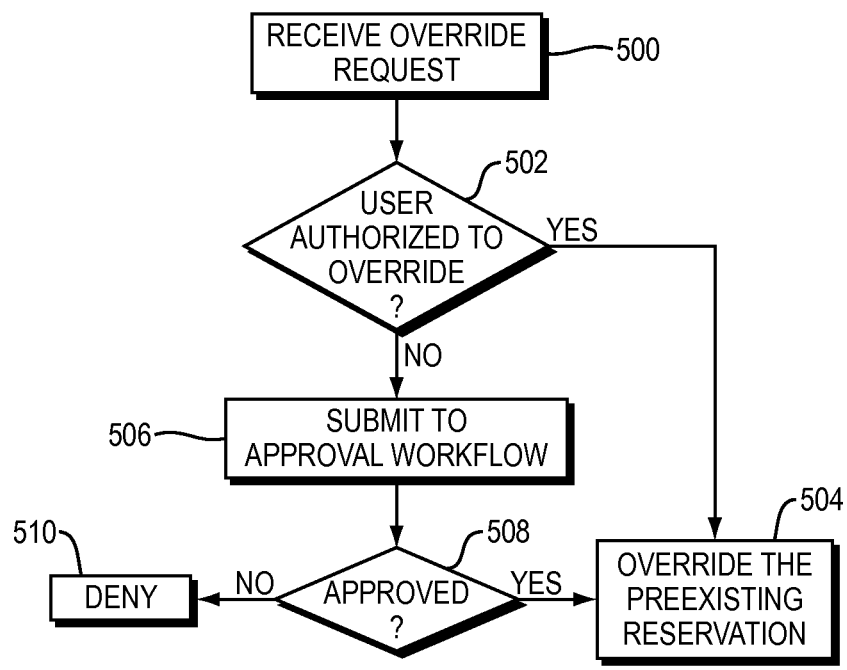
FIG. 5 is a flowchart illustrating a reservation override process implemented by the resource reservation environment in accordance with exemplary embodiments of the present disclosure.

FIG. 5 is a flowchart illustrating a reservation override process in accordance with an exemplary embodiment of the environment 100. In step 500, the environment 100 can receive an override request from a user. In step 502, the environment can programmatically determine if the user is authorized to override a preexisting reservation, for example, based on the user's employment title (e.g., CEO, vice president, director, etc.). If the user is authorized to override the preexisting reservation, the environment overrides the preexisting reservation to reserve the resource for the user in step 504. Otherwise, the environment 100 submits the user's request to a workflow for approval in step 506. The approval can include approval from one or more employees of the enterprise. If upon completion of the workflow, it is determined that the request has been approved (step 508), the environment 100 overrides the preexisting reservation to reserve the resource for the user in step 504. Otherwise, the request to override the preexisting reservation is denied by the environment in step 510.

Figure 6:
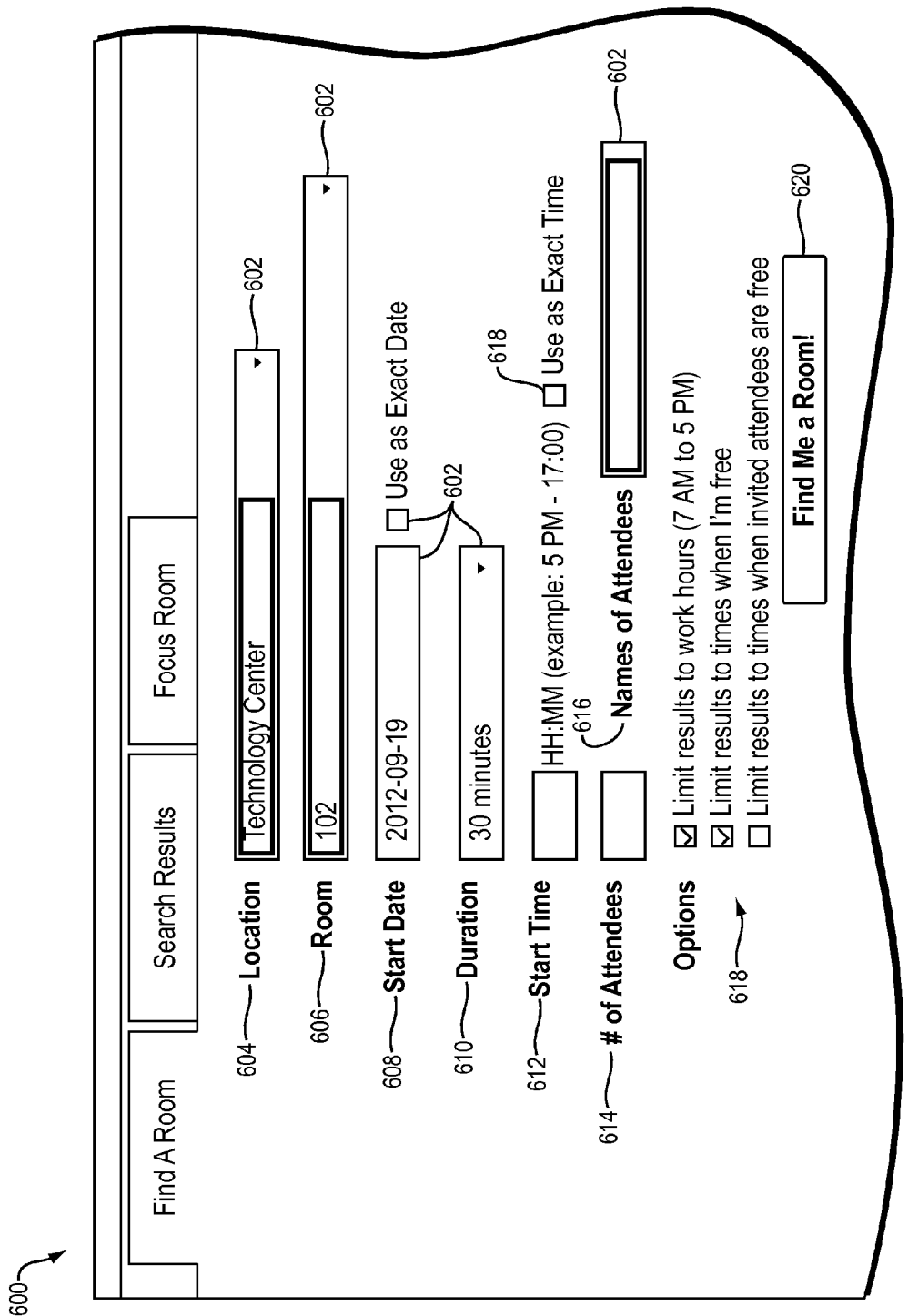
FIG. 6 is an exemplary graphical user interface that can be provided by a user interface of an exemplary embodiment of the environment to facilitate searching for resources.

FIG. 6 is an exemplary GUI 600 that can be provided by an exemplary embodiment of the user interface 110. The GUI 600 can be programmed and/or configured to facilitate searching for enterprise resources based on search parameters entered by the user. In the present embodiment, the enterprise resource corresponds to rooms (e.g., conference rooms) in one or more buildings of the enterprise. For example, the GUI 600 can be programmed and/or configured to include data entry fields 602 to receive inputs from the user. For example, a data entry field 604 can facilitate entry of a location parameter, data entry field 606 can facilitate entry of room parameter, and data entry field 608 can facilitate entry of a date parameter, data entry field 610 can facilitate entry of a duration parameter for which the user would like to reserve the room, data entry field 612 facilitates entry of a start time parameter, data entry field 614 facilitates entry of a quantity of attendees parameter, data entry field 616 facilitates entry of names of invited attendees parameter, and data entry fields 618 facilitate selection of one or more parameters specified by the user interface 100, such as restricting search results to working hours, restricting search results to the user's availability, restricting search results to the availability of one or more invited attendees, limiting the search to an exact time and/or exact date, and so on.

In some embodiments, the user interface can be programmed to provide a selection of possible resource search parameters. For example, the user interface can be programmed and/or configured to provide drop down menus including possible parameters. In the present embodiment, data entry fields 604, 606, and 610 can be drop down menus.

Once the user has entered the requested data in the data entry fields 602, the user can click on a submit button 620 to initiate the resource search. While the present embodiment illustrates various data entry fields for receiving one or more search parameters, those skilled in the art will recognize that the GUI 600 can be programmed and/or configured to provide more, fewer, and/or different data entry fields and that a user can perform a search without entering parameters for all or some of the data entry fields.

Figure 7:
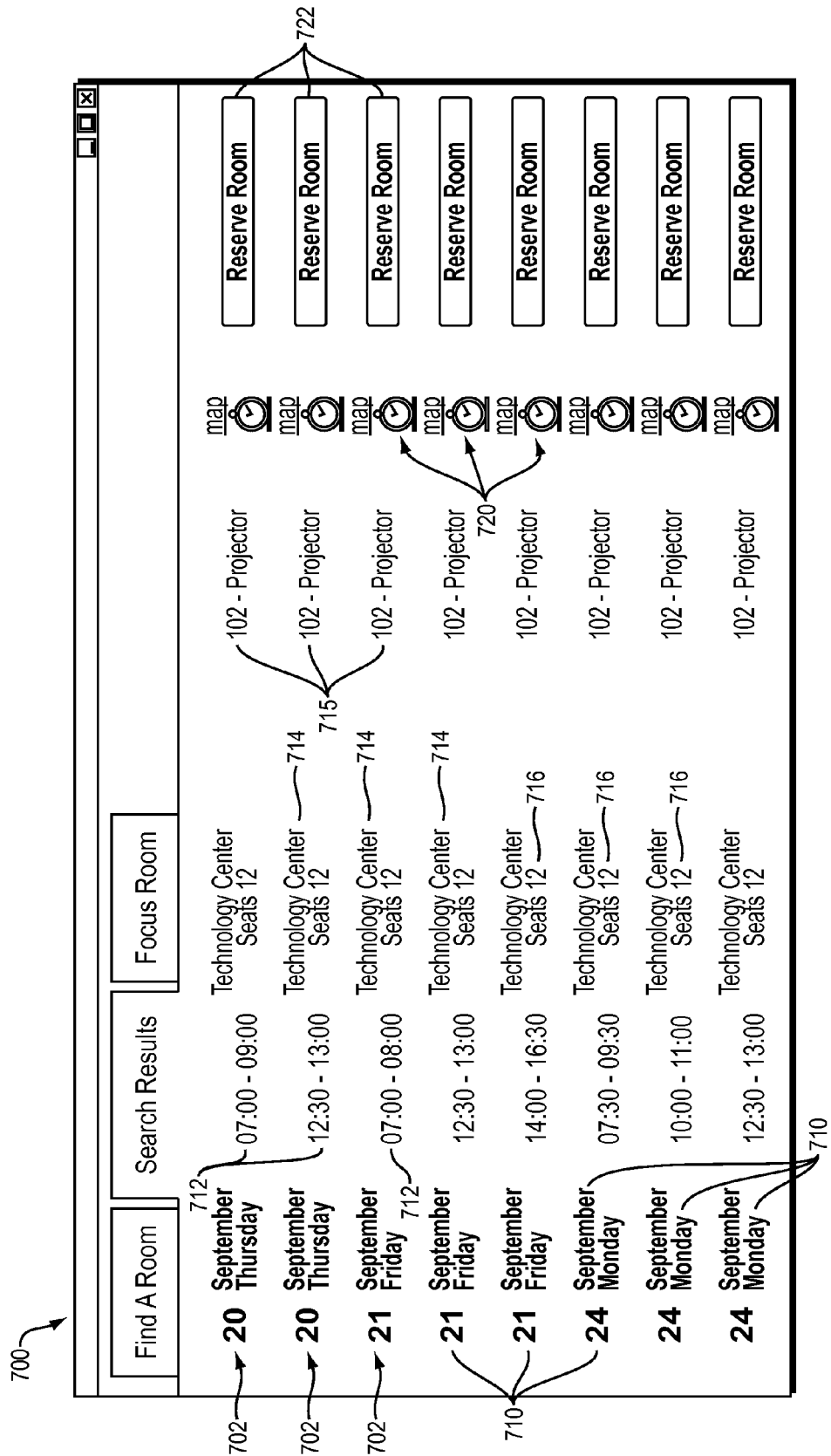
FIG. 7 is another exemplary graphical user interface that can be provided by a user interface of an exemplary embodiment of the environment to provide resource search results.

FIG. 7 is an exemplary GUI 700 that can be provided by an exemplary embodiment of the user interface. The GUI 700 can be programmed and/or configured to display enterprise resources 702 returned in response to a search request as well as metadata associated with the enterprise resources. In the present embodiment, the search was performed to identify the availability of a specific room with the identifier 715 (i.e. "102"). This identifier can be used by the environment to retrieve metadata associated with this enterprise resource so that the enterprise resource can be displayed with its associated metadata. The results can includes dates 710, available times 712, locations 714, a number of available seats 716 of the enterprise resource, equipment 718 associated with the resource (e.g., a projector), as well as a selectable link 720 to a map of the location of the enterprise resource. The resource can be displayed in a list and can be sorted by date, location, and available times. To reserve the resource, the user can select a reserve room button 722 that corresponds to the resource, day, and time that the user would like to reserve.

Figure 8:
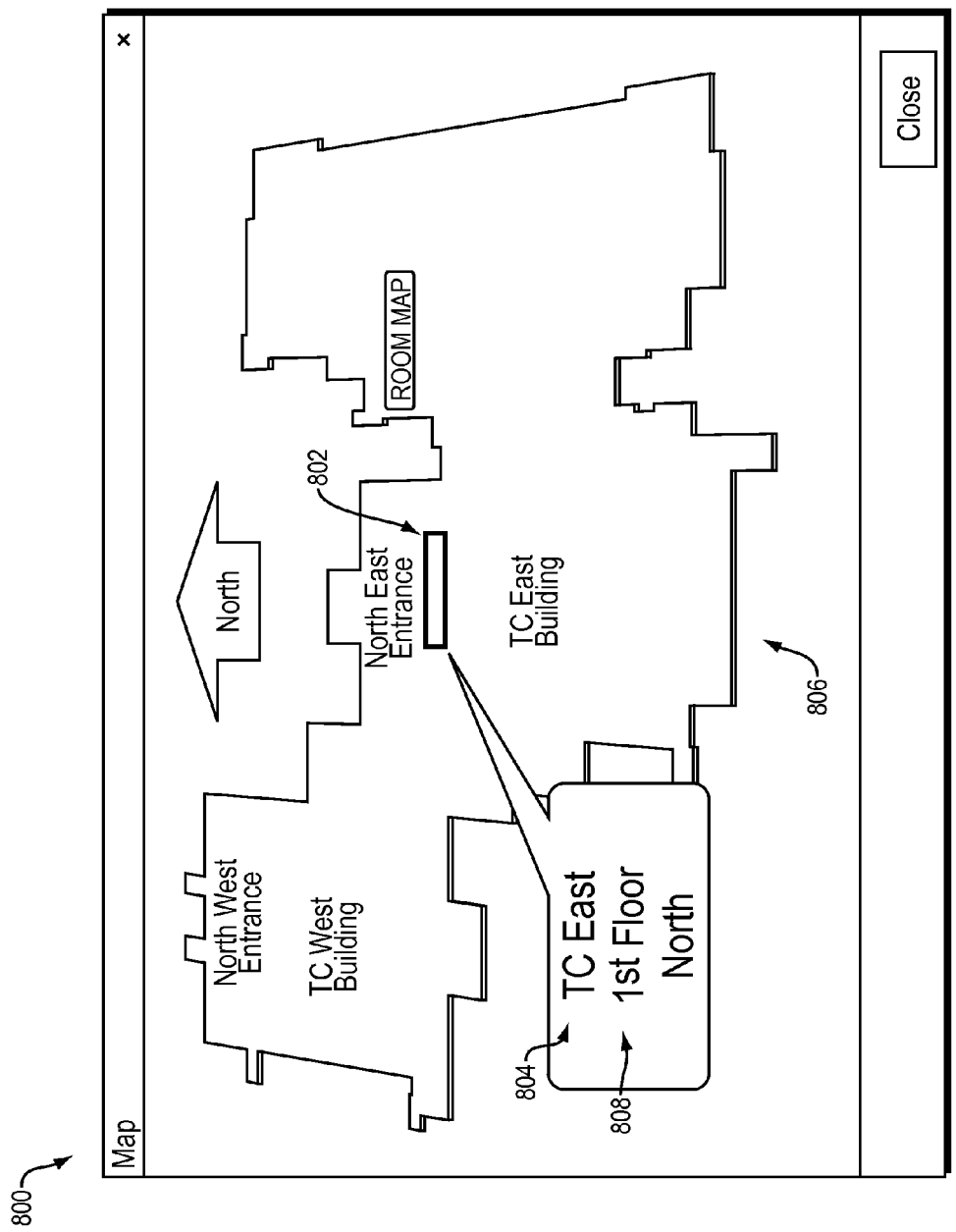
FIG. 8 is an exemplary location map that can be provided in accordance with exemplary embodiments of the present disclosure.

FIG. 8 shows an exemplary map 800 that can be displayed to the user in response to a selection of the map link 720 shown in FIG. 7. The map can provide the user with a location 802 of the resource include a building 804 in which the resource is located, a location 806 in the building identifies on which floor the resource resides and the location 808 of the resource on that floor. In some embodiments, the map can be interactive. The user interface can be programmed and/or configured to implement an interactive global positioning system (GPS), position tracking using wireless communication (e.g., via triangulation techniques known to those skilled in the art), and/or any other suitable position tracking techniques. For example, the user can open the map on his mobile device (e.g., tablet, cell phone, laptop), which can be GPS enabled and the user interface can display the user's location relative to the location of the enterprise resource.

In exemplary embodiments, an interactive map can be generated for enterprise resources residing in one or more locations before and/or after a search request is submitted. The interactive map can show multiple enterprise resources that can be selected by the user. In response, to a selection of one of the resources on the map, reservation information can be displayed to the user. Likewise, the map can include indicators associated with the enterprise resources to indicate any availability of the enterprise resource for a specified time period (e.g., over the next hour, day, week, etc.).

Figure 9:
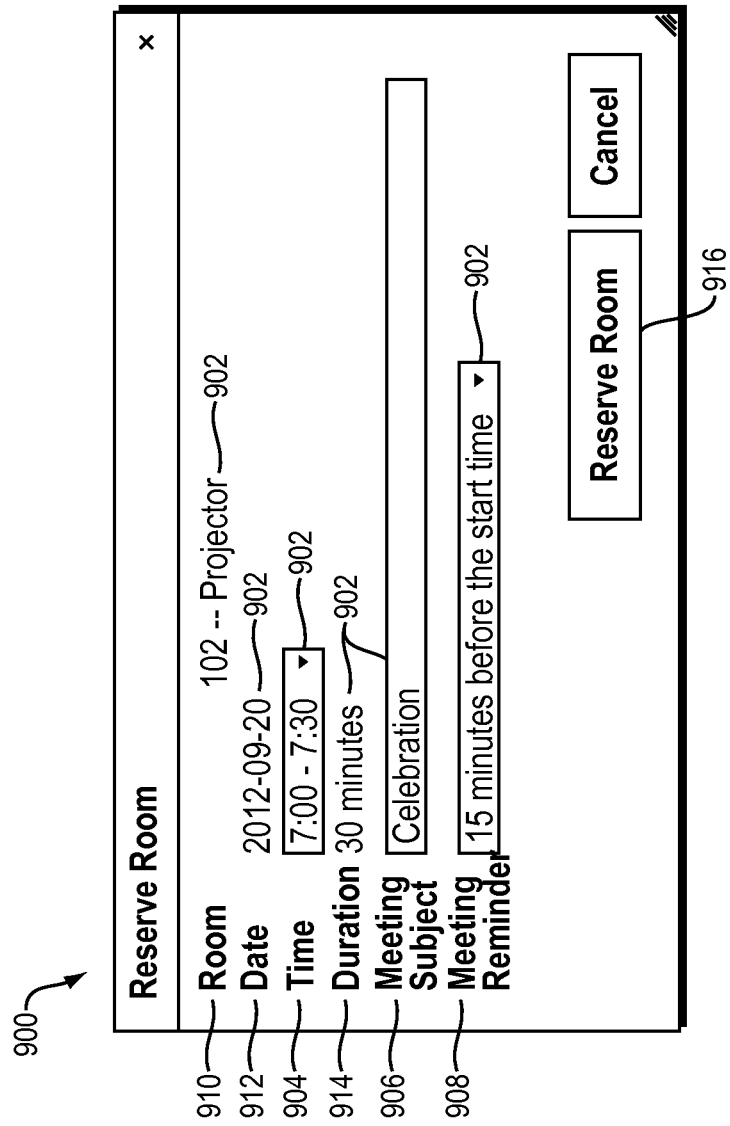
FIG. 9 is an exemplary graphical user interface that can be provided by a user interface of an exemplary embodiment of the environment to facilitate reserving a resource.

FIG. 9 is an exemplary GUI 900 that can be provided by an exemplary embodiment of the user interface 110. The GUI 900 can be programmed and/or configured to open in response to a selection of a reserve room button 922 selected by the user in GUI 900 shown in FIG. 9. The GUI 900 can include data entry fields 902 to receive inputs from the user. For example, a data entry field 904 can facilitate entry of a time parameter, data entry field 906 facilitates entry of a meeting subject parameter, and data entry fields 908 facilitates entry of a meeting reminder parameter. In the present embodiment, the user interface can be programmed and/or configured to specify the room parameter 910, the date parameter 912, and the duration parameter 914. Once the user has entered the requested reservation parameters in the data entry fields 902, the user can click on a reserve room button 916 to initiate the reservation of the room. While the present embodiment illustrates various data entry fields for receiving one or more search parameters, those skilled in the art will recognize that the GUI 900 can be programmed and/or configured to provide more, fewer, and/or different data entry fields and the user interface can be programmed and/or configured to specify more, fewer, and/or different reservation parameters.

Figure 10:
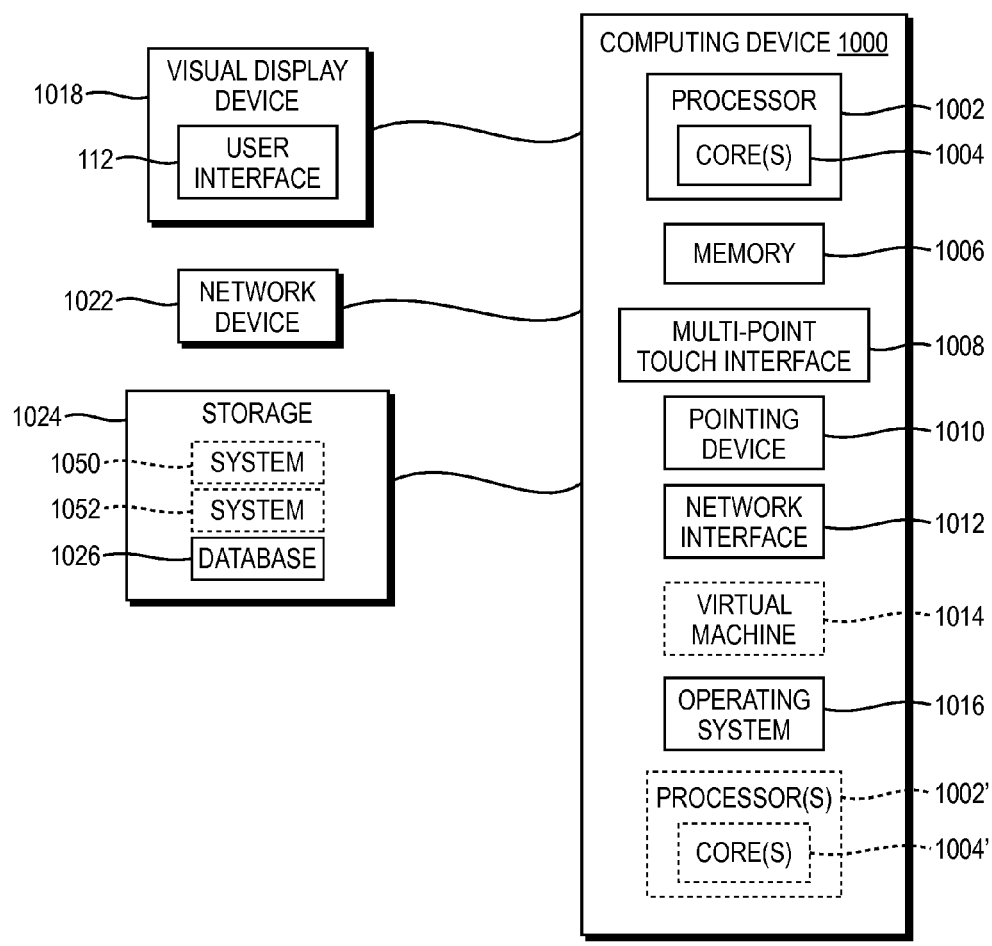
FIG. 10 is a block diagram of an exemplary computing device for implementing embodiments of the present disclosure.

FIG. 10 is a block diagram of an exemplary computing device 1000 that may be used to implement exemplary embodiments of the front end reservation system 1050 and/or the back end reservation system 1052 described herein. The computing device 1000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 1006 included in the computing device 1000 may store computer-readable and computer-executable instructions or software for implementing exemplary embodiments of the front end reservation system 1050 and/or the back end reservation system 1052. The computing device 1000 also includes configurable and/or programmable processor 1002 and associated core 1004, and optionally, one or more additional configurable and/or programmable processor(s) 1002' and associated core(s) 1004' (for example, in the case of computer systems having multiple processors/cores), for executing computer-readable and computer-executable instructions or software stored in the memory 1006 and other programs for controlling system hardware. Processor 1002 and processor(s) 1002' may each be a single core processor or multiple core (1004 and 1004') processor.

Virtualization may be employed in the computing device 1000 so that infrastructure and resources in the computing device may be shared dynamically. A virtual machine 1014 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, EDO RAM, and the like. Memory 1006 may include other types of memory as well, or combinations thereof.

A user may interact with the computing device 1000 through a visual display device 1018, such as a computer monitor, which may display one or more graphical user interfaces 112 that may be provided in accordance with exemplary embodiments. The computing device 1000 may include other I/O devices for receiving input from a user, for example, a keyboard or any suitable multi-point touch interface 1008, a pointing device 1010 (e.g., a mouse). The keyboard 1008 and the pointing device 1010 may be coupled to the visual display device 1018. The computing device 1000 may include other suitable conventional I/O peripherals.

The computing device 1000 may also include one or more storage devices 1024, such as a hard-drive, CD-ROM, or other computer readable media, for storing data and computer-readable instructions and/or software that implement exemplary embodiments of the front end reservation system 1050 and/or the back end reservation system 1052 described herein. Exemplary storage device 1024 may also store one or more databases for storing any suitable information required to implement exemplary embodiments. For example, exemplary storage device 1024 can store one or more databases 1026 for storing information, such as enterprise resource identifier, metadata associated with the enterprise resources, availability/unavailability of the enterprise resources, user and employee availabilities, location maps, search parameters, reservation parameters, and/or any other information to be used by embodiments of the systems 1050 and/or 1052. The databases may be updated manually or automatically at any suitable time to add, delete, and/or update one or more items in the databases.

The computing device 1000 can include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 1000 may run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

Figure 11:
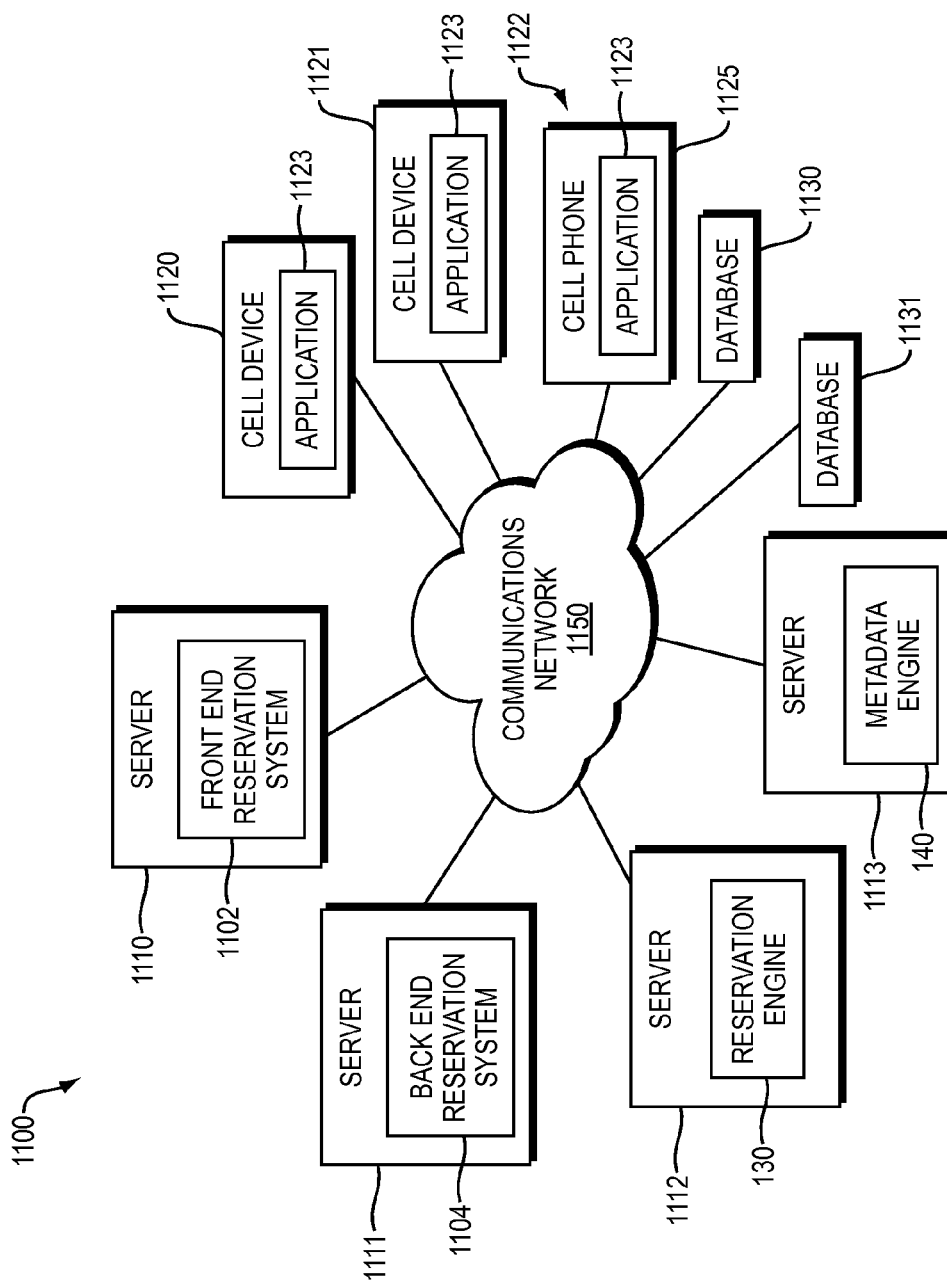
FIG. 11 is a block diagram of an exemplary client-server environment for implementing embodiments of the resource reservation environment.

FIG. 11 is a block diagram of an exemplary client-server environment 1100 configured to implement one or more embodiments of the environment 100. The environment 1100 includes servers 1110-1113 operatively coupled to clients 1120-1122, via a communication network 1150, which can be any network over which information can be transmitted between devices communicatively coupled to the network. For example, the communication network 1150 can be the Internet, Intranet, virtual private network (VPN), wide area network (WAN), local area network (LAN), and the like. The environment 1100 can include repositories or database devices 1130, 1131, which can be operatively coupled to the servers 1110-1113, as well as to clients 1120-1122, via the communications network 1150. The servers 1110-1113, clients 1120-1122, and database devices 1130, 1131 can be implemented as computing devices. Those skilled in the art will recognize that the database devices 1130, 1131 can be incorporated into one or more of the servers 1110-1113 such that one or more of the servers can include databases.

In an exemplary embodiment, a front end reservation system 1102 (i.e., the user interface 110, the search interface 150, the reservation interface 160, the metadata interface 170, and the issue tracker 180) can be implemented by the server 1110 and a back end reservation system 1104 (i.e., the reservation engine 130 and the metadata engine 140) can be implemented by the server 1111. In some embodiments, the front end reservation system 1102 and/or the back end reservation system 1104 can be distributed over different servers. For example, the reservation engine 130 can be implemented on the server 1112 and the metadata engine 140 can be implemented on the server 1113. Likewise, in some embodiments, the user interface 110, the search interface 150, the reservation interface 160, the metadata interface 170, and the issue tracker 180 of the front end reservation system can be distributed across different servers.

The client devices 1120-1122 can include a client side application 1123 programmed and/or configured to access the user interface 110 to search for resources and/or reserve resources. In the present embodiment, the client devices 1120-1121 can be computing device, such as a tablet and a desktop computing device and the client device 1122 can be a cell phone 1125. In one embodiment, the client-side application 1123 implemented by each of the client devices 1120-1121 can be a web-browser capable of navigating to one or more web pages hosting GUIs of the user interface. Alternatively, or in addition, the client-side application 1123 implemented by the client device 1122 (i.e. a cell phone) can be a mobile application installed on the client device 1122 to permit access to the user interface.

The databases 1130-1131 can store information for use by the environment 1100. For example, the database 1130 can store information related to the reservation engine including availability/unavailability of resources as well as other information and the database 1131 can store metadata for the metadata engine.

In exemplary embodiments, the server on which the user interface 110 resides (e.g., server 1110) can serve the user interface upon request by the client-side applications 1123. The users of the client devices 1120-1122 can interact with the user interface to perform search for and/or reserve resources as described here, In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A method in an electronic reservation environment, the method comprising:
   receiving, via a processing device, a scan from a portable device of an encoded identifier from a physical location of at least one resource of a plurality of resources in an enterprise to report an issue associated with the at least one resource of the plurality of resources;
   receiving, on an issue tracker operatively coupled to the processing device, the reported issue associated with the at least one resource of the plurality of resources based on the received encoded identifier, wherein the issue is a maintenance problem associated with the at least one resource of the plurality of resources;
   updating, via the issue tracker, metadata of the at least one resource of the plurality of resources indicating the maintenance problem;
   generating, via the issue tracker, an electronic trouble ticket for the at least one resource of the plurality of resources with issues in the issue tracker;
   receiving, via a data communications network, an electronic search request for an availability of one or more resources of the plurality of resources in the enterprise, the search request including one or more resource search parameters received via a graphical user interface of the electronic reservation environment;
   searching for the one or more resources based on the one or more resource search parameters;
   outputting a subset of resources from the plurality of resources including the at least one resource of the plurality of resources in response to the search request;
   receiving a selection of the at least one resource of the plurality of resources;
   displaying, via the portable device, an identity of the at least one resource of the plurality of resources, an availability of the at least one resource of the plurality of resources, and the metadata associated with the at least one resource of the plurality of resources including the maintenance problem and at least one selectable link to a location map associated with the at least one resource of the plurality of resources;
   in response to a selection, via the portable device, of the at least one selectable link by a user, determining the user's location based on a global positioning system (GFS) data determined by the portable device;
   rendering, on the graphical user interface, an interactive map of the location of the at least one resource of the plurality of resources, wherein the graphical user interface includes a geographic position of the user relative to the location of the at least one resource of the plurality of resources based on the GFS data;
   receiving a request, via the portable device, to reserve the at least one resource of the plurality of resources;
   receiving an input indicating the issue associated with the at least one resource of the plurality of resources has been resolved;
   updating, via the issue tracker, the metadata of the at least one resource of the plurality of resources the issue associated with the at least one resource of the plurality of resources has been resolved; and
   transmitting, via the processing device, to the portable device an alert indicating the issue associated with the at least one resource of the plurality of resources has been resolved.

2. The method of claim 1, further comprising receiving the reservation request for the at least one resource of the plurality of resources in response to a selection by the user, the reservation request including reservation parameters.

3. The method of claim 2, further comprising determining whether the user has authority to reserve one of the resources.

4. The method of claim 2, wherein the at least one resource is reserved in response to the reservation request.

5. The method of claim 1, further comprising:
   maintaining a waiting list for an unavailable resource; and
   notifying a user when the unavailable resource becomes available.

6. The method of claim 4, further comprising:
   receiving a subsequent reservation request for one of the resources that conflicts with an availability of the one of the resources; and
   overriding a preexisting reservation for the one of the resources to permit the one of the resources to be reserved in response to submission of the subsequent reservation request.

7. The method of claim 4, further comprising:
   receiving a scan of an encoded identifier from a physical location of a resource to submit a second search request;
   displaying an availability of the resource in response to the second request; and
   receiving a reservation request for the resource based on the availability from the second request.

8. The method of claim 6, further comprising outputting a confirmation that the resource has been reserved.

9. The method of claim 1, wherein the one or more resource search parameters include an availability of the user.

10. The method of claim 1, wherein an unavailability of the resources is received in the subset and the method further comprises:
    programmatically determining the availability of the resource based on the unavailability; and
    displaying the availability of the resource with the identity of the resource and the metadata.

11. The method of claim 1, wherein the metadata associated with the resource provides information corresponding to a condition of the resource.

12. The method of claim 11, wherein the condition of the resource includes a status of equipment associated with the resource.

13. The method of claim 11, wherein the condition of the resource is entered in the graphical user interface by the user.

14. A non-transitory computer-readable storage device configured to store instruction executable by a processing device, wherein execution of the instructions causes the processing device to implement a method comprising:
    receiving, via a processing device, a scan from a portable device, of an encoded identifier from a physical location of at least one resource of a plurality of resources in an enterprise to report an issue associated with the at least one resource of the plurality of resources;
    receiving, on an issue tracker operatively coupled to the processing device, the reported issue associated with the at least one resource of the plurality of resources based on the received encoded identifier, wherein the issue is a maintenance problem associated with the at least one resource of the plurality of resources;
    updating, via the issue tracker, metadata of the at least one resource of the plurality of resources indicating the maintenance problem;

generating, via the issue tracker, an electronic trouble ticket for the at least one resource of the plurality of resources with issues in the issue tracker;
receiving, via a data communications network, an electronic search request for an availability of one or more resources of the plurality of resources in the enterprise, the search request including one or more resource search parameters received via a graphical user interface of the electronic reservation environment;
searching for the one or more resources based on the one or more resource search parameters;
outputting a subset of resources from the plurality of resources including the at least one resource of the plurality of resources in response to the search request;
receiving a selection of the at least one resource of the plurality of resources;
displaying, via the portable device, an identity of the at least one resource of the plurality of resources, an availability of the at least one resource of the plurality of resources, and the metadata associated with the at least one resource of the plurality of resources including the maintenance problem and at least one selectable link to a location map associated with the at least one resource of the plurality of resources;
in response to a selection, via the portable device, of the at least one selectable link by a user, determining the user's location based on a global positioning system (GPS) data determined by the portable device;
rendering, on the graphical user interface, an interactive map of the location of the at least one resource of the plurality of resources, wherein the graphical user interface includes a geographic position of the user relative to the location of the at least one resource of the plurality of resources based on the GFS data;
receiving a request, via the portable device, to reserve the at least one resource of the plurality of resources;
receiving an input indicating the issue associated with the at least one resource of the plurality of resources has been resolved;
updating, via the issue tracker, the metadata of the at least one resource of the plurality of resources the issue associated with the at least one resource of the plurality of resources has been resolved; and
transmitting, via the processing device, to the portable device an alert indicating the issue associated with the at least one resource of the plurality of resources has been resolved.

15. The non-transitory computer-readable storage device of claim 14, wherein execution of the instructions by the processing device causes the processing device to receive the reservation request for the at least one resource of the plurality of resources in response to a selection by the user, the reservation request including reservation parameters, the at least one resource being reserved in response to the reservation request.

16. The non-transitory computer-readable storage device of claim 15, wherein execution of the instructions by the processing device causes the processing device to:
receive a subsequent reservation request for the resource that conflicts with an availability of the resource; and
override a preexisting reservation for the resource to permit the resource to be reserved in response to submission of the subsequent reservation request.

17. The non-transitory computer-readable storage device of claim 14, wherein execution of the instructions by the processing device causes the processing device to:

receive the scan of an encoded identifier from the physical location of the resource to submit the resource search request;
display an availability of the resource in response to the request; and
receive a reservation request for the resource based on the availability.

18. The non-transitory computer-readable storage device of claim 14, wherein an unavailability of the resources is received in the subset and wherein execution of the instructions by the processing device causes the processing device to:
programmatically determine the availability of the resource based on the unavailability; and
display the availability of the resource with the identity of the resource and the metadata.

19. A system for reserving resources in an enterprise comprising:
a non-transitory computer readable medium storing instructions for implementing a front end reservation system; and
a processing device operatively coupled to the computer readable medium and programmed to execute the instructions to:
receive a scan from a portable device, of an encoded identifier from a physical location of at least one resource of a plurality of resources in an enterprise to report an issue associated with the at least one resource of the plurality of resources;
receive, on an issue tracker operatively coupled to the processing device, the reported issue associated with the at least one resource of the plurality of resources based on the received encoded identifier, wherein the issue is a maintenance problem associated with the at least one resource of the plurality of resources;
update, via the issue tracker, a metadata of the at least one resource of the plurality of resources indicating the maintenance problem;
generating, via the issue tracker, an electronic trouble ticket for the at least one resource of the plurality of resources with issues in the issue tracker;
receive, via a data communications network, an electronic search request for an availability of one or more resources of the plurality of resources in the enterprise, the search request including one or more resource search parameters received via a graphical user interface of the electronic reservation environment;
search for the one or more resources based on the one or more resource search parameters;
output a subset of resources from the plurality of resources including the at least one resource of the plurality of resources in response to the search request;
receiving a selection of the at least one resource of the plurality of resources;
display, via the portable device, an identity of the at least one resource of the plurality of resources, an availability of the at least one resource of the plurality of resources, and the metadata associated with the at least one resource of the plurality of resources including the maintenance problem and at least one selectable link to a location map associated with the at least one resource of the plurality of resources;
in response to a selection, via the portable device, of the at least one selectable link by a user, determine the user's location based on a global positioning system (GPS) data determined by the portable device;

rendering an interactive map of the location of the at least one resource of the plurality of resources on a display that includes a geographic position of the user relative to the location of the at least one resource of the plurality of resources based on the GPS data;

receive a request, via the portable device, to reserve the at least one resource of the plurality of resources;

receive an input indicating the issue associated with the at least one resource of the plurality of resources has been resolved;

update, via the issue tracker, the metadata of the at least one resource of the plurality of resources the issue associated with the at least one resource of the plurality of resources has been resolved; and transmit to the portable device an alert indicating the issue associated with the at least one resource of the plurality of resources has been resolved.

20. The system of claim 19, wherein the processing device is programmed to execute the instructions to submit the reservation request for the at least one resource of the plurality of resources in response to a selection by a user, the reservation request including reservation parameters, the at least one resource being reserved in response to the reservation request.

21. The system of claim 19, wherein an unavailability of the resources is received in the subset and wherein the processing device is programmed to execute the instructions to:

programmatically determine the availability of the resource based on the unavailability; and display the availability of the resource with the identity of the resource and the metadata.

* * * * *

UNITED STATES PATENT AND TRADEMARK OFFICE
CERTIFICATE OF CORRECTION

PATENT NO. : 9,798,983 B2
APPLICATION NO. : 13/793633
DATED : October 24, 2017
INVENTOR(S) : John Paul Thompson et al.

It is certified that error appears in the above-identified patent and that said Letters Patent is hereby corrected as shown below:

In the Specification

Column 4, Line 41, please replace "show" with --shows--.

Column 5, Line 66, please replace "chose" with --choose--.

Signed and Sealed this
Fourteenth Day of May, 2019

Andrei Iancu
*Director of the United States Patent and Trademark Office*